US010104431B2

(12) United States Patent
Jin et al.

(10) Patent No.: US 10,104,431 B2
(45) Date of Patent: Oct. 16, 2018

(54) METHODS AND SYSTEMS FOR RESOLVING RECORDING CONFLICTS IN A HYBRID CLOUD-LOCAL DIGITAL VIDEO RECORDING SYSTEM

(71) Applicant: Verizon Patent and Licensing Inc., Arlington, VA (US)

(72) Inventors: Zhiying Jin, Lexington, MA (US); Sandeep G. Rathi, Woburn, MA (US); Yuhui Qian, Lexington, MA (US); Ravi Kalluri, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/199,927

(22) Filed: Jun. 30, 2016

(65) Prior Publication Data
US 2018/0007437 A1   Jan. 4, 2018

(51) Int. Cl.
*H04N 5/76* (2006.01)
*H04N 7/00* (2011.01)
*H04N 7/025* (2006.01)
*H04N 7/16* (2011.01)
*H04N 9/80* (2006.01)
*H04N 21/458* (2011.01)
*H04N 5/765* (2006.01)
*H04N 21/4147* (2011.01)
(Continued)

(52) U.S. Cl.
CPC ....... *H04N 21/4583* (2013.01); *H04N 5/7605* (2013.01); *H04N 5/765* (2013.01); *H04N 21/2668* (2013.01); *H04N 21/4147* (2013.01); *H04N 21/4334* (2013.01); *H04N 21/4335* (2013.01); *H04N 21/4532* (2013.01); *H04N 21/478* (2013.01)

(58) Field of Classification Search
CPC ........... H04N 21/4583; H04N 5/44508; H04N 21/258; H04N 21/26275; H04N 21/4227; H04N 21/44204; H04N 7/173; H04N 5/765
USPC ........... 386/293, 248, 292; 348/472; 725/34, 725/135
See application file for complete search history.

(56) References Cited

U.S. PATENT DOCUMENTS 9,699,510 B2 * 7/2017 Barton ............... H04N 21/4583
2003/0067554 A1 * 4/2003 Klarfeld ............... G11B 27/105
348/461
(Continued)

*Primary Examiner* — Thai Tran
*Assistant Examiner* — Syed Hasan

(57) ABSTRACT

An exemplary method includes a cloud-based service provider system detecting an input command provided by a user during a scheduling session and representative of a request for a local digital video recording ("DVR") system to record a media program during a presentation time period. In response to the detecting of the input command, the cloud-based service provider system identifies a conflict associated with the request for the local DVR system to record the media program, performs a prioritization operation to determine a relative priority of media programs that are at least one of scheduled to be recorded by the local DVR system at any given time during the presentation time period and currently recorded in a memory of the local DVR system, and automatically performs, based on the performing of the prioritization operation, a predetermined action to resolve the conflict and facilitate the local DVR system recording the media program.

16 Claims, 11 Drawing Sheets

(51) Int. Cl.
*H04N 21/4335* (2011.01)
*H04N 21/45* (2011.01)
*H04N 21/433* (2011.01)
*H04N 21/478* (2011.01)
*H04N 21/2668* (2011.01)

(56) References Cited

U.S. PATENT DOCUMENTS

2009/0142042 A1\* 6/2009 Branam ............. H04N 21/4135
 386/299
2009/0220216 A1\* 9/2009 Marsh ................. H04L 12/6418
 386/292

\* cited by examiner

METHODS AND SYSTEMS FOR RESOLVING RECORDING CONFLICTS IN A HYBRID CLOUD-LOCAL DIGITAL VIDEO RECORDING SYSTEM

BACKGROUND INFORMATION

Digital video recording ("DVR") systems allow users to record media programs (e.g., television programs, etc.) and then view or otherwise experience the recorded media programs. For example, a user may use a DVR system to schedule a recording of a particular television program, after which the DVR system may record the television program and allow the user to play back the recorded television program in a time-shifted manner.

Unfortunately, various types of limitations associated with a DVR system may result in a recording conflict for a media program scheduled to be recorded by the DVR system. The recording conflict may prevent the DVR system from being able to perform the scheduled recording of the media program without one or more other scheduled recordings being canceled and/or without one or more other already-recorded media programs being deleted. For example, a maximum recording limitation associated with the DVR system (i.e., a maximum number of media programs that the DVR system is able to concurrently record due to hardware and/or service agreement limitations) and/or a storage space limitation may prevent the DVR system from performing a scheduled recording of a media program. In order to resolve such recording conflicts, conventional DVR systems may require that the user take remedial action (e.g., by specifically requiring that the user select which scheduled recording to cancel and/or which recorded media program to delete), which is time consuming and interruptive to the user.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
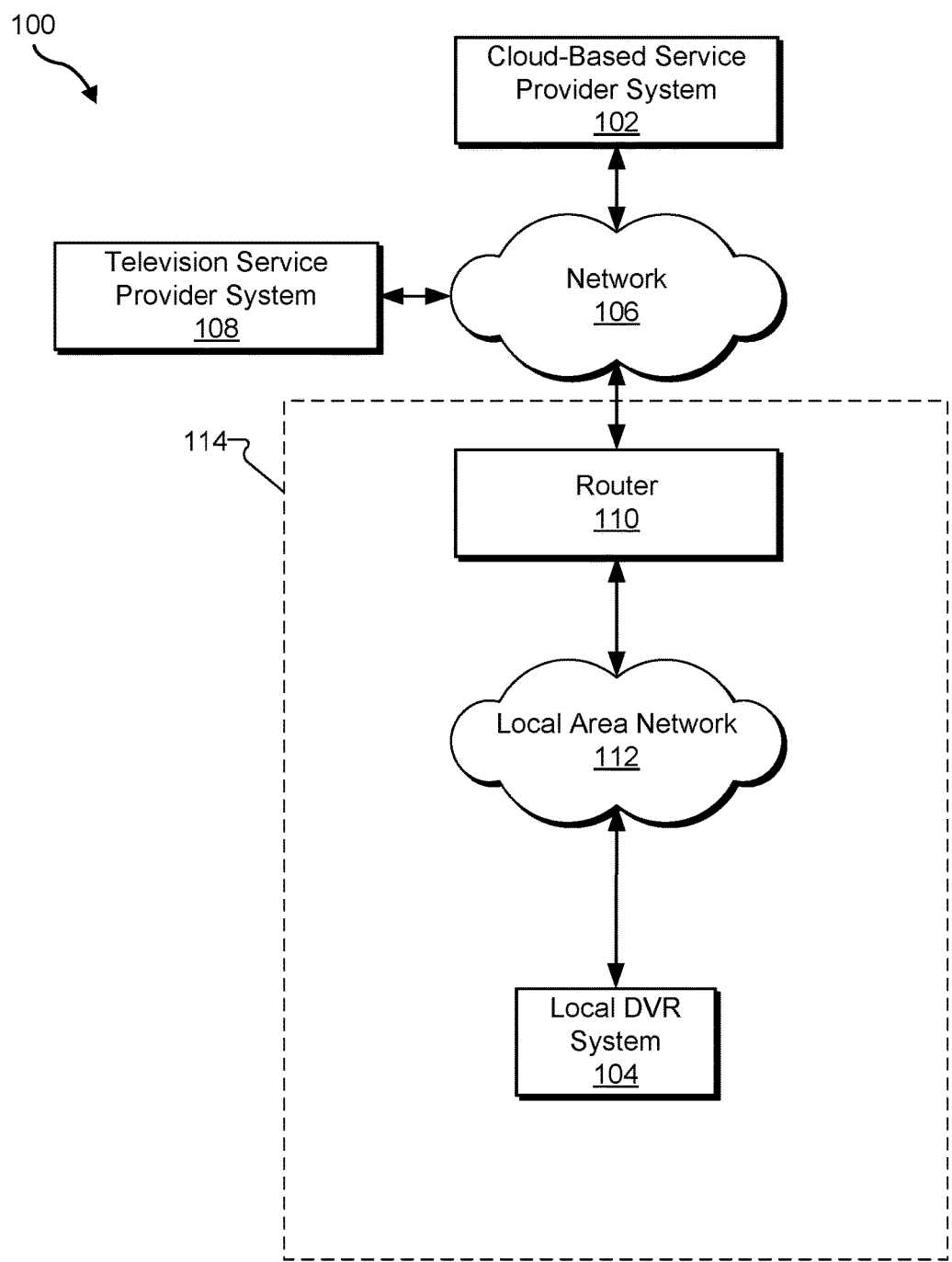
FIG. 1 shows an exemplary configuration in which a cloud-based service provider system is remote from and communicatively coupled to a local DVR system according to principles described herein.

Methods and systems for resolving recording conflicts in a hybrid cloud-local DVR system are described herein. As will be illustrated below, a hybrid cloud-local DVR system may include a local DVR system located at an end-user premises and a cloud-based service provider system located remotely from (e.g., not at the end-user premises) and communicatively coupled to the local DVR system. The local DVR system may be configured to record media programs locally at the end-user premises as directed by the cloud-based service provider system. Together, the cloud-based service provider system and the local DVR system may be considered a hybrid cloud-local DVR system in which media programs are managed, as described herein, by the cloud-based service provider system as part of a cloud service but are recorded and stored locally by a local DVR system at the end-user premises as directed by the cloud-based service provider system. The methods and systems described herein may efficiently manage how the local DVR system records media programs and maintains locally recorded media programs when there are conflicts associated with the recording of additional media programs.

As used herein, the term "media program" may refer to any television program, on-demand media program, pay-per-view media program, broadcast media program (e.g., live broadcast television program), multicast media program (e.g., multicast television program), narrowcast media program (e.g., narrowcast video-on-demand program), Internet Protocol television ("IPTV") media program, advertisement, video, movie, audio program, radio program, video clip, audio clip, user-generated audio program, user-generated video program, or any other media program or audio-video program that may be streamed to and recorded by a local DVR system.

In some embodiments, a cloud-based service provider system remote from and communicatively coupled to a local DVR system by way of a network (e.g., the Internet) is configured to detect an input command provided by a user (e.g., an end user of a media service provided by the cloud-based service provider system and the local DVR system) during a scheduling session and representative of a request for the local DVR system to record a media program during a presentation time period. The cloud-based service provider system may identify a conflict associated with the request for the local DVR system to record the media program. In response to the identification of the conflict, the cloud-based service provider system may perform a prioritization operation to determine a relative priority of media programs that are at least one of scheduled to be recorded by the local DVR system at any given time during the presentation time period and currently recorded in a memory of the local DVR system. Based on the performance of the prioritization operation, the cloud-based service provider system may automatically perform a predetermined action to resolve the conflict and facilitate the local DVR system recording the media program.

For example, if the cloud-based service provider system determines that the maximum number of media programs that are already scheduled to be concurrently recorded by the local DVR system at any given time during the presentation time period is equal to a maximum-number-of-streams limitation associated with the local DVR system, the cloud-based service provider system may perform a prioritization operation to prioritize the media programs. Based on the prioritization operation, the cloud-based service provider system may automatically perform a predetermined action to resolve the conflict. For example, the cloud-based service provider system may cancel one of the scheduled recordings. This may include canceling one of the already-scheduled recording and scheduling the media program for recording by the local DVR system. Conversely, if the cloud-based service provider system determines that the maximum number of media programs that are already scheduled to be concurrently recorded by the local DVR system at any given time during the presentation time period is less than the maximum-number-of-streams limitation, the cloud-based service provider system may schedule the media program for recording by the local DVR system without canceling any of the already-scheduled recordings.

Additionally or alternatively, if the cloud-based service provider system determines that a maximum amount of storage space of the local DVR system will be exceeded as a result of the recording of the media program, the cloud-based service provider system may perform a prioritization operation to prioritize the media programs already stored in a memory of the local DVR system. Based on the prioritization operation, the cloud-based service provider system may automatically perform a predetermined action to resolve the conflict. For example, the cloud based service provider system may automatically delete one of more of the stored media programs from the memory of the local DVR system and schedule the media program for recording by the local DVR system. Conversely, if the cloud-based service provider system determines that the maximum amount of storage space will not be exceeded, the cloud-based service provider system may schedule the media program for recording by the local DVR system without deleting one or more of the already-stored media programs from the memory of the local DVR system.

The methods and systems described herein may provide automated conflict resolution when a user attempts to schedule a recording of a media program by a local DVR system. This may ensure that the local DVR system will actually be able to record the media program when it comes time for the media program to be recorded (e.g., when the media program is to be streamed during a presentation time period), while also reducing any potentially unwanted effects that may be caused by recording the media program when a recording conflict exists. For example, methods and systems described herein may detect a recording conflict and facilitate automatic performance of a remedial action that prioritizes scheduled recordings and/or stored recordings of media programs and cancels relatively lower priority scheduled recordings and/or deletes relatively lower priority stored recordings to make available sufficient resources to support a recording of the media program by the local DVR system when a recording conflict is detected.

In addition, because the methods and systems described herein use a hybrid cloud-local DVR system, more information regarding, for example, a user's access to and/or consumption of media content is accessible than would otherwise be accessible through conventional DVR systems. For example, a hybrid cloud-local DVR system may be able to access information associated with the user from various different sources such as media player devices, media content access systems, service providers, etc. The various different sources may be either internal or external to the hybrid cloud-local DVR system. The methods and systems described herein may use such information in any suitable manner, such as described herein, to provide automated conflict resolution when a user attempts to access and/or record a media program through a local DVR system. By using such information to prioritize media programs as described herein, the hybrid cloud-local DVR system may effectively reduce or prevent any unwanted effects that may be caused by automatic performance of a remedial action to resolve a recording conflict.

FIG. 1 shows an exemplary configuration 100 in which a cloud-based service provider system 102 is remote from and communicatively coupled to a local DVR system 104 by way of a network 106. As shown, configuration 100 further includes a television service provider system 108 communicatively coupled to network 106, a router 110 (e.g., an end-user premises network router) communicatively coupled to network 106 and to a local area network 112 communicatively coupled to local DVR system 104. As shown, local DVR system 104 and router 110 may be located within an end-user premises 114 (e.g., a home, business, or other geographic area) associated with a user.

Network 106 may include one or more wide area networks (e.g., the Internet), wireless communication networks, mobile telephone networks (e.g., cellular telephone networks), closed media networks, open media networks, subscriber television networks, and/or any other networks capable of carrying data (e.g., media streams) and/or communications signals. Cloud-bases service provider system 102 and television service provider system 108 may be connected to network 106 in any suitable way. Local DVR system 104 may also be connected to network 106 in any suitable way, such as by way of router 110 and local area network 112, and thereby communicate with cloud-based service provider system 102 and/or television service provider system 108. Local area network 112 may include any suitable network that connects network-enabled devices within end-user premises 114. For example, local area network 112 may include a wired and/or wireless network (e.g., an Ethernet network and/or a Wi-Fi network) provided by router 110.

Cloud-based service provider system 102, local DVR system 104, television service provider system 108, and router 110 may communicate one with another using any communication platforms and technologies suitable for transporting data (e.g., media streams) and/or communication signals, including known communication technologies, devices, media, and protocols supportive of remote communications, examples of which include, but are not limited to, data transmission media, communications devices, Internet Protocol ("IP"), Transmission Control Protocol ("TCP"), User Datagram Protocol ("UDP"), Hypertext Transfer Protocol ("HTTP"), Hypertext Transfer Protocol Secure ("HTTPS"), Real-Time Transport Protocol ("RTP"), Session Initiation Protocol ("SIP"), Simple Object Access Protocol ("SOAP"), Extensible Mark-up Language ("XML") and variations thereof, radio frequency ("RF") signaling technologies, Code Division Multiple Access ("CDMA") technologies, Global System for Mobile Communications ("GSM") technologies, Time Division Multiple Access ("TDMA") technologies, Short Message Service ("SMS"), Multimedia Message Service ("MMS"), wireless communication technologies, Internet communication technologies, media streaming technologies, media download technologies, and other suitable communications technologies.

Cloud-based service provider system 102 may provide a cloud service that manages local DVR system 104 and/or with which an end user of the cloud service may interact with cloud-based service provider system 102 to manage local DVR system 104. The cloud service may include any suitable network-based service capable of performing the management operations described herein. The cloud service may manage media programs that are stored and/or scheduled to be stored by local DVR system 104. For example, the recording of the media programs may be scheduled through the cloud service, media programs may be deleted or undeleted through the cloud service, and/or media programs may be protected by the cloud service such that only authorized users can access the media programs. Cloud-based service provider system 102 may be associated with (e.g., maintained and/or provided by) any suitable entity (e.g., a television service provider that is also associated with television service provider system 108, a third party entity not associated with television service provider system 108, a network service provider, etc.). Exemplary components of cloud-based service provider system 102 will be described below.

Television service provider system 108 may provide a television service for access by one or more users (e.g., a user associated with user premises 114). The television service may include a subscription television service and/or any other television service that provides access to television programming. For example, television service provider system 108 may transmit media streams (e.g., IPTV streams) to local DVR system 104 by way of network 106. Television service provider system 108 may be associated with (e.g., maintained and/or provided by) a television service provider and/or any other entity as may serve a particular implementation.

Cloud-based service provider system 102 and television service provider system 108 are shown in FIG. 1 to be separate systems for illustrative purposes only. It will be recognized that cloud-based service provider system 102 and television service provider system 108 may be integrated into a single system and/or associated with the same entity.

Router 110 may include any suitable network communication device that may be located within user premises 114 and that may receive and distribute media streams provided by television service provider system 108 to local DVR system 104. Router 110 may include, for example, a broadband home router configured to receive IPTV streams from television service provider system 108 via network 106 and distribute the IPTV streams to local DVR system 104 via local area network 112. In certain examples, router 110 may be configured to receive and/or distribute no more than a predetermined number of media streams (e.g., IPTV streams) at a given time (e.g., due to hardware, firmware, and/or software limitations of router 110).

Local DVR system 104 may include any device or combination of devices that may be located at an end-user premises as may suit a particular implementation. In certain examples, local DVR system 104 may be implemented by a local DVR device (e.g., a stand-alone, dedicated local DVR device) located at an end-user premises (e.g., end-user premises 114). For example, local DVR system 104 may include a local DVR device that is separate from and communicatively coupled to one or more media player devices (e.g., a set-top-box ("STB") device) and/or other devices at the end-user premises. To illustrate, local DVR system 104 may include a local DVR device that is located in a first room at an end-user premises (e.g., end-user premises 114), a first media player device located in a second room at the end-user premises, and a second media player device located in a third room at the end-user premises.

A local DVR device may include any suitable computing device or combination of computing devices configured to receive and record media streams received by any of the devices included in or communicatively coupled to local DVR system 104. Accordingly, a local DVR device may provide DVR functionality to a media player device, even if the media player device does not have its own DVR storage capabilities. For example, a user of a media player device may provide a request for the media player device to play back a media program recorded by local DVR system 104. In response to the request, cloud-based service provider system 102 may direct a local DVR device that is separate from and communicatively coupled to the media player device (e.g., by way of local area network 112) to transmit a media stream that includes the recorded media program to the media player device for playback by the media player device.

A media player device may include one or more computing devices configured to receive a media stream and present the media stream by displaying video content (e.g., a video component of a media program) included in the media stream on a display screen and/or playing audio content (e.g., an audio component of a media program) included in the media stream with an audio speaker. For example, a media player device may include a set-top box device, a computer, a tablet computer, a smart phone device, a gaming console, and/or any other type of computing device capable of receiving and presenting media streams. In some examples, a media player device may be IP-based (i.e., a media player device configured to receive and present IPTV streams). As will be described below, in certain examples a media player device may not have its own DVR storage capabilities.

Alternatively, in certain examples, local DVR system 104 may be incorporated in a media player device. For example, local DVR system 104 may be incorporated in a STB device located at end-user premises 114.

In certain examples, local DVR system 104 may include or be communicatively coupled to a display screen. The display screen may be configured to display media content included in media streams received and processed by a media player device that may be included in or communicatively coupled to local DVR system 104. The display screen may be separate from and communicatively connected to the media player device. For example, a display screen may include a television or a computer monitor separate from and connected to a STB device. Alternatively, a display screen may be integrated into a media player device. For example, a display screen may include a screen that is a part of a tablet computer.

Local DVR system 104 may include any system local to user premises 114 and configured to record media programs provided by a television service. For example, local DVR system 104 may include an IPTV processing system configured to receive and record IPTV streams provided by television service provider system 108 as part of an IPTV service.

In some examples, local DVR system 104 may be capable of concurrently receiving and recording no more than a maximum number of media streams (i.e., media programs) at any given time. This maximum number may be referred to as a "maximum-number-of-streams limitation" of the local DVR system 104. In some examples, the maximum-number-of-streams limitation is determined by hardware capabilities of local DVR system 104 (e.g., local DVR system 104 may only have a certain number of tuners or other hardware configured to concurrently receive and record media content streams). Additionally or alternatively, the maximum-number-of-streams limitation may be determined by hardware capabilities of router 110 (e.g., router 110 may be configured to process no more than a certain number of media content streams at a given time). Additionally or alternatively, the maximum-number-of-streams limitation may be determined by a service agreement that governs an operation of local DVR system 104. For example, a user of local DVR system 104 may subscribe to a DVR service that specifies that local DVR system 104 may concurrently receive and record no more than a specified number of media streams.

Local DVR system 104 may additionally or alternatively have a predetermined amount of storage space that may be used to store recorded media programs. This storage space limitation may be determined by hardware capabilities of local DVR system 104 (e.g., local DVR system 104 may be configured to record media programs to a hard drive or other storage medium that has a particular amount of storage space available for media program recordings). Additionally or alternatively, the storage space limitation may be determined by a service agreement that governs an operation of local DVR system 104. For example, a user of local DVR system 104 may subscribe to a DVR service that specifies that local DVR system 104 may store no more than a predetermined amount of data representative of recorded media programs.

Figure 2:
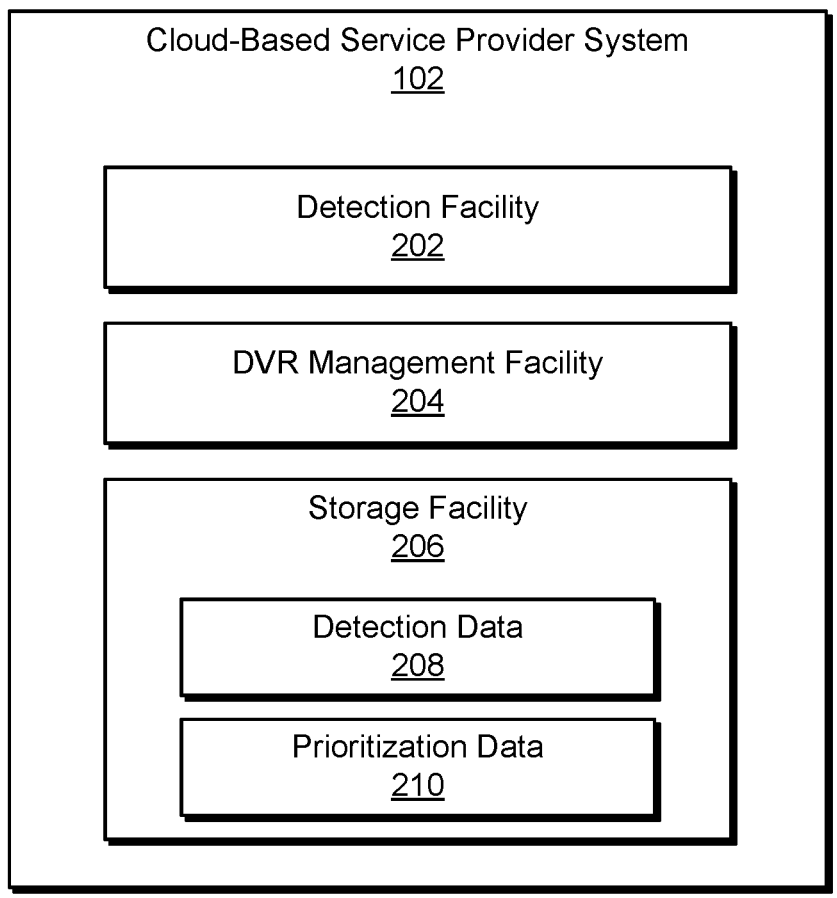
FIG. 2 illustrates various components of a cloud-based service provider system according to principles described herein.

FIG. 2 illustrates various components of cloud-based service provider system 102. As shown, cloud-based service provider system 102 may include, without limitation, a detection facility 202, a DVR management facility 204, and a storage facility 206 selectively and communicatively coupled to one another. It will be recognized that although facilities 202-206 are shown to be separate facilities in FIG. 2, any of facilities 202-206 may be combined into fewer facilities, such as into a single facility, or divided into more facilities as may serve a particular implementation. Additionally or alternatively, one or more of the facilities 202-206 may be omitted from and external to cloud-based service provider system 102 in other implementations. For example, storage facility 206 may be external of and communicatively coupled to cloud-based service provider system 102 in certain alternative implementations. Facilities 202-206 of cloud-based service provider system 102 may include or be otherwise implemented by one or more computing devices specifically configured to perform one or more of the operations described herein. In such implementations, cloud-based service provider system 102 may be referred to as a computer-implemented cloud-based service provider system 102.

Storage facility 206 may store detection data 208 generated and/or used by detection facility 202 and prioritization data 210 generated and/or used by DVR management facility 204. Storage facility 206 may store additional or alternative data as may serve a particular implementation.

Data stored by storage facility 206 may be accessed by cloud-based service provider system 102 from any suitable source, including a source internal or external to cloud-based service provider system 102. Storage facility 206 may permanently or temporarily store data. In certain examples, cloud-based service provider system 102 may access certain data from a source external to cloud-based service provider system 102 and temporarily store the data in storage facility 206 for use by detection facility 202 and/or DVR management facility 204. In certain examples, data generated by detection facility 202 and/or DVR management facility 204 may be stored permanently or temporarily to storage facility 206.

Detection facility 202 may detect an input command provided by a user and representative of a request for a local DVR system (e.g., local DVR system 104) to perform a DVR operation with respect to a media program provided by a television service. As used herein, a "DVR operation" refers to a recording operation, a playback operation, a delete operation, and/or any other suitable operation as may serve a particular implementation. For example, the request may include a request for a local DVR device included in the local DVR system to record the media program. As another example, the request may include a request for a media player device included in the local DVR system to play back the media program.

Detection facility 202 may detect the input command provided by the user and representative of the request for the local DVR system to perform the DVR operation in any suitable manner. For example, detection facility 202 may detect the input command by receiving the input command from a media player device or a local DVR device. To illustrate, a user may provide the input command by using a remote control device to transmit the input command to the media player device. The media player device may relay or otherwise transmit the input command to detection facility 202 by way of local area network 112 and network 106 without performing the DVR operation represented by the input command.

As another example, detection facility 202 may detect the input command by receiving the input command directly from a remote control device and/or any other computing device not included in local DVR system 104. To illustrate, a user may provide the input command by utilizing a remote control device. The remote control device may be configured to transmit the input command directly to cloud-based service provider system 102 (e.g., by way of networks 112 and 106) while bypassing local DVR system 104. Detection facility 202 may detect the input command by receiving the input command transmitted from the remote control device. It will be recognized that the input command may alternatively be provided by an application executed by a mobile device utilized by the user, a web-based application accessed by way of a computing device, and/or any other source as may serve a particular implementation.

In some examples, detection facility 202 may detect an input command provided by a user during a scheduling session and representative of a request for the local DVR system to record a media program during a presentation time period. In certain examples, the request may be for the local DVR system to record the media program at some point in the future with respect to when the input command is provided. Alternatively, the request may be for the local DVR system to record the media program at the time (e.g., immediately) that the user provides the input command.

DVR management facility 204 may, in response to the detection of the input command, identify a conflict associated with the request for a local DVR system (e.g., local DVR system 104) to record the media program in any suitable manner. The conflict may include any conflict or combination of conflicts that may prevent the local DVR system from recording a media program. For example, the conflict may include a maximum-number-of-streams conflict and/or a maximum storage space conflict.

To illustrate an example of identifying a maximum-number-of-streams conflict, DVR management facility 204 may identify a maximum number of media programs other than the media program and that are already scheduled to be concurrently recorded by the local DVR system at any given time during the presentation time period. To this end, DVR management facility 204 may identify a plurality of time slots included in the presentation time period. The plurality of time slots may be defined by start and stop times of the media program and a plurality of media programs already scheduled to be recorded during at least a portion of the presentation time period. DVR management facility 204 may then determine recording counts for the plurality of time slots, the recording counts each representative of a total number of media programs included in the plurality of media programs and that are scheduled to be recorded during each of the plurality of time slots. DVR management facility 204 may then identify a particular recording count included in the recording counts and that is greater than a remainder of the recording counts and designate the particular recording count as the maximum number of media programs other than the media program and that are already scheduled to be concurrently recorded by the local DVR system at any given time during the presentation time period.

Figure 3:
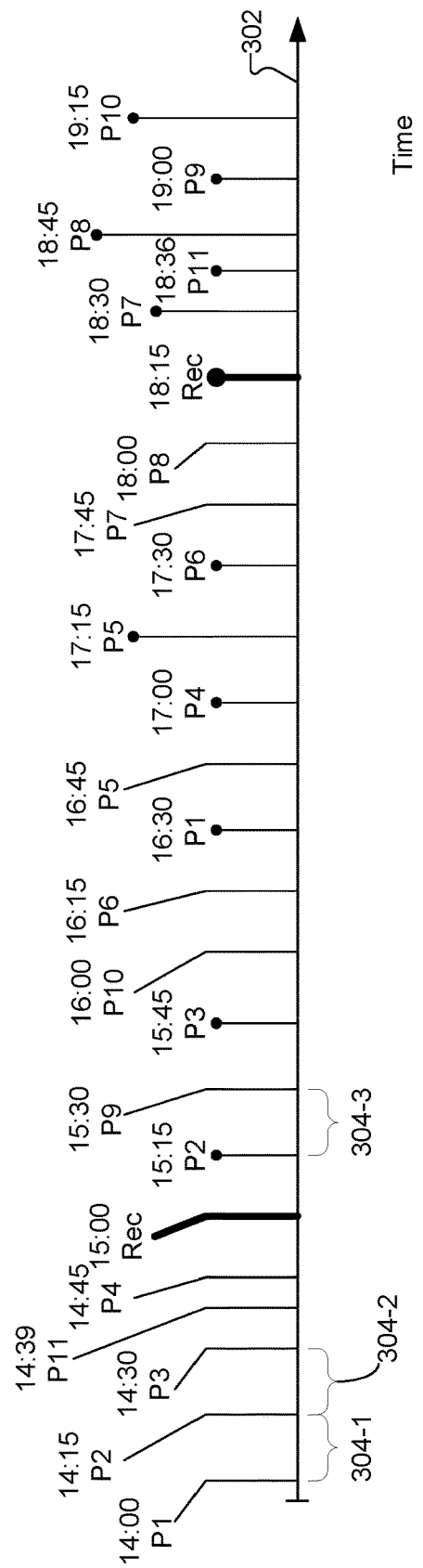
FIG. 3 shows a timeline that indicates start and stop times of a plurality of media programs scheduled to be recorded by a local DVR system according to principles described herein.

To illustrate, FIG. 3 shows a timeline 302 that indicates start and stop times of a plurality of media programs (labeled P1 through P11) scheduled to be recorded by a local DVR system (e.g., local DVR system 104). As used herein, a "start time" of a media program refers to a time at which the media program is scheduled to begin being presented and a "stop time" of a media program refers to a time at which the media program is scheduled to end being presented. As shown in FIG. 3, the start times of the media programs are represented by angled lines and the stop times of the media programs are represented by straight lines with circular endpoints. For example, the start time of P1 is 14:00 (i.e., 2:00 pm) and the stop time of P1 is 16:30 (i.e., 4:30 pm), the start time of P2 is 14:15 (i.e., 2:15 pm) and the stop time of P2 is 15:15 (i.e., 3:15 pm), etc.

As mentioned, the start and stop times of the media programs scheduled to be recorded by the local DVR system define a plurality of time slots. For example, the time slots may be defined by sequential and adjacent points in time that correspond to either start or stop times of the media programs. For example, FIG. 3 shows a first time slot 304-1 defined by the start time for P1 and the start time for P2 and a second time slot 304-2 defined by the start time for P2 and the start time for P3. As another example, time slot 304-3 shown in FIG. 3 is defined by a stop time of P2 and a start time for P9.

FIG. 3 also shows a start time (i.e., 15:00) and a stop time (i.e., 18:15) that define a presentation time period for a media program labeled "Rec" for which a user provides an input command during a scheduling session for the local DVR system to record. As shown, the presentation time periods for various media programs already scheduled for recording at least partially overlap the presentation time period of the media program labeled "Rec". To determine how many media programs are scheduled for concurrent recording at any given time during the presentation time period of the media program labeled "Rec", DVR management facility 204 may count how many media programs are scheduled for recording during each time slot that is included within the presentation time period of the media program labeled "Rec".

To illustrate, Table 1 below shows the start and end times for each time slot included within the presentation time period of the media program labeled "Rec" (i.e., each time slot between times 15:00 and 18:15). As shown, DVR management facility 204 may identify the media programs that are scheduled to be presented during each time slot (i.e., that overlap with each time slot) and generate a "recording count" for each time slot that indicates how many media programs are scheduled for recording during each time slot. For example, during the first time slot included in the presentation time period (i.e., the time slot that has a start time of 15:00 and an end time of 15:15), DVR management facility 204 may determine that five media programs are being concurrently recorded during the first time slot (i.e., media programs P1, P2, P3, P11, and P4).

TABLE 1

| Time Slot | Start Time | End Time | Overlapping Media Program IDs | Recording Count |
| --- | --- | --- | --- | --- |
| 1 | 15:00 | 15:15 | P1, P2, P3, P11, P4 | 5 |
| 2 | 15:15 | 15:30 | P1, P3, P11, P4 | 4 |
| 3 | 15:30 | 15:45 | P1, P3, P11, P4, P9 | 5 |
| 4 | 15:45 | 16:00 | P1, P4, P11, P9 | 4 |
| 5 | 16:00 | 16:15 | P1, P4, P11, P9, P10 | 5 |
| 6 | 16:15 | 16:30 | P1, P4, P11, P9, P10, P6 | 6 |
| 7 | 16:30 | 16:45 | P4, P11, P9, P10, P6 | 5 |
| 8 | 16:45 | 17:00 | P4, P11 P9, P10, P6, P5 | 6 |
| 9 | 17:00 | 17:15 | P11, P9, P10, P6, P5 | 5 |
| 10 | 17:15 | 17:30 | P11, P9, P10, P6 | 4 |
| 11 | 17:30 | 17:45 | P11, P9, P10 | 3 |
| 12 | 17:45 | 18:00 | P11, P9, P10, P7 | 4 |
| 13 | 18:00 | 18:15 | P11, P9, P10, P7, P8 | 5 |

Once DVR management facility 204 has determined the recording count for each time slot included in the presentation time period, DVR management facility 204 may identify the highest recording count and designate the highest recording count as the maximum number of media programs that are scheduled to be concurrently recorded by the local DVR system at any given time during the presentation time period. For example, in the present example, the highest recording count is six, which occurs in both the sixth and eighth time slots listed in Table 1.

DVR management facility 204 may determine whether the maximum number of media programs that are scheduled to be concurrently recorded by the local DVR system at any given time during the presentation time period equals the maximum-number-of-streams limitation of the local DVR system.

For example, continuing with the present example, if the maximum-number-of-streams limitation (which may be determined by DVR management facility 204 in any suitable manner) of the local DVR system is six, DVR management facility 204 may determine that the maximum number of media programs that are scheduled to be concurrently recorded by the local DVR system at any given time during the presentation time period equals the maximum-number-of-streams limitation of the local DVR system. In response, DVR management facility 204 may automatically perform various actions. For example, DVR management facility 204 may perform a prioritization operation to determine which of the streams to cancel to facilitate recording the media program during the presentation time period. Exemplary prioritization operations are described herein.

Alternatively, if the maximum-number-of-streams limitation of the local DVR system is seven, DVR management facility 204 may determine that the maximum number of media programs that are already scheduled to be concurrently recorded by the local DVR system at any given time during the presentation time period is less than the maximum-number-of-streams limitation of the local DVR system. In response, DVR management facility 204 may schedule the media program labeled "Rec" for recording by the local DVR system without canceling any of the recordings of other media programs that are already scheduled to be recording during at least a portion of the presentation time period.

In certain examples, DVR management facility 204 may identify a maximum number of streams conflict that includes a combination of media programs that are concurrently recorded by the local DVR device and media programs that are concurrently streamed by one or more media player devices during a presentation time period. For example, DVR management facility 204 may determine that the local DVR device is concurrently receiving and recording five media programs at the same time that a media player device at the end-user premises (e.g., end-user premises 114) is receiving and presenting a sixth media program. If the maximum-number-of-streams limitation associated with the local DVR system is six, DVR management facility 204 may automatically perform a prioritization operation to determine which of the streams associated with the six media programs to cancel so that the local DVR device may record the media program that is the subject of the request.

In some examples, DVR management facility 204 may identify a conflict based on an amount of available storage space in a memory of a local DVR system. For example, DVR management facility 205 may determine at any suitable time (e.g., during the scheduling session or afterwards) whether the local DVR system will have enough storage space available to record the media program during the presentation time period.

Figure 4:
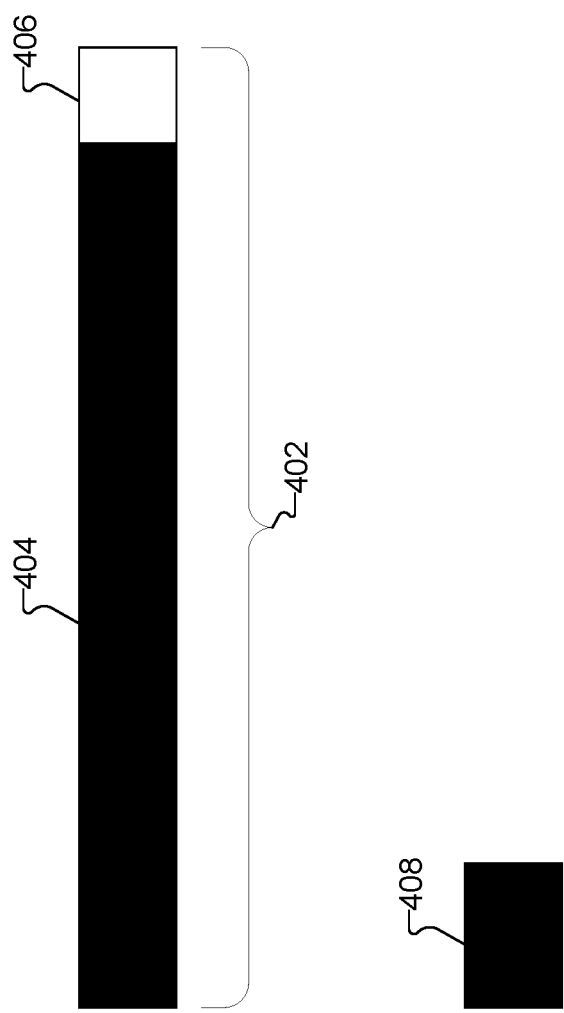
FIG. 4 shows an exemplary diagram illustrating an available data storage capacity of a local DVR system as compared to a data storage size of a media program according to principles described herein.

DVR management facility 204 may determine whether a local DVR system (e.g., local DVR system 104) will have enough storage space available to record the media program during the presentation time period in any suitable manner. For example, DVR management facility 204 may compare the amount of content currently stored in the memory of the local DVR system to the amount of memory required to record the media program. To illustrate, FIG. 4 shows a diagram in which a maximum storage capacity 402 of the local DVR system is represented. In the example shown in FIG. 4, a horizontal thickness of the section indicated by reference numeral 404 represents an amount of storage that is currently being used in a memory of the local DVR system and a horizontal thickness of the section indicated by reference numeral 406 represents an amount of free space in the memory of the local DVR system. A horizontal thickness of the section indicated by reference numeral 408 represents an amount of storage that will be required to record the media program. Because the horizontal thickness indicated by reference numeral 408 is larger than the horizontal thickness indicated by reference numeral 406, DVR management facility 204 may identify a conflict based on a lack of available storage space in the memory of the local DVR system and may perform a prioritization operation to select one or more media programs currently stored in the memory of the local DVR system to delete to make room for the media program that is the subject of the request.

Additionally or alternatively, DVR management facility 204 may determine a first storage space amount required to record the media program, determine a second storage space amount required to record all other media programs already scheduled to be recorded by the local DVR system prior to and during the presentation time period, determine an available storage space amount for the local DVR system at a time that the input command is detected, and determine whether the available storage space amount minus the second storage space amount is equal to or greater than the first storage space amount. For example, DVR management facility 204 may determine that 5 GB of storage space will be required to record the media program, and that 50 GB of storage space will be required to record all other media programs already scheduled to be recorded by the local DVR system prior to and during the presentation time period of the media program. DVR management facility 204 may also determine that the local DVR system has only 52 GB of storage space available when the user provides the input command to record the media program. Based on this data, DVR management facility 204 may determine that the local DVR system is 3 GB short of being able to record the media program (i.e., the local DVR system does not have enough storage space to record the media program during the presentation time period).

DVR management facility 204 may determine the storage space amounts required to store media programs in any suitable manner. For example, DVR management facility 204 may determine the first and second storage space amounts by accessing metadata (which may be maintained by the television service provider or another entity) associated with the various media programs scheduled for recording and that indicates a size of the media programs. Additionally or alternatively, DVR management facility 204 may estimate the storage space requirements based on a temporal length of each of the media programs (e.g., a temporal length of a presentation time period of each of the media programs).

In certain examples, DVR management facility 204 may identify a plurality of conflicts associated with the request for a local DVR system to record a media program. For example, DVR management facility 204 may identify that a first conflict and a second conflict are both associated with the request to record the media program. When there is a plurality of conflicts, DVR management facility 204 may perform a first prioritization operation to resolve the first conflict and a second prioritization operation to resolve the second conflict. To illustrate, DVR management facility 204 may determine that a maximum-number-of-streams limitation will be exceeded at some point during the presentation time period of the media program. Accordingly, DVR management facility 204 may determine that there is a maximum-number-of-streams conflict associated with the request to record the media program. In addition, DVR management facility 204 may determine that there is not enough storage space in the memory of the local DVR system to record the media program during the presentation time period. Accordingly, in such an example, DVR management facility 104 may also determine that there is a maximum storage space conflict associated with the request to record the media program. In such an example, DVR management facility 204 may perform one or more prioritization operations to first facilitate resolving the maximum-number-of-streams conflict. Afterwards, DVR management facility 204 may perform one or more additional prioritization operations to facilitate resolving the maximum storage space conflict. Alternatively, DVR management facility 204 may resolve the maximum storage space conflict prior to resolving the maximum-number-of-streams conflict. Exemplary prioritization operations will now be described.

In response to identification of a conflict, DVR management facility 204 may perform a prioritization operation to determine a relative priority of media programs that are at least one of scheduled to be recorded by the local DVR system at any given time during the presentation time period and currently recorded in a memory of the local DVR system. The prioritization operation may include any number or combination of prioritization operations as may suit a particular implementation.

DVR management facility 204 may perform the prioritization operation in any suitable manner. For example, DVR management facility 204 may perform a prioritization operation to determine a relative priority of the media programs. After DVR management facility 204 performs the prioritization operation, DVR management facility 204 may determine that the prioritization operation results in a prioritization of the media programs that will facilitate resolving the conflict and recording the media program. If the prioritization operation results in a prioritization of the media programs that will facilitate resolving the conflict, DVR management facility 204 may refrain from performing additional prioritization operations.

In examples where the conflict is associated with a maximum-number-of-streams limitation, the prioritization operation may include, for example, determining the relative priority based on a content type characteristic of each of the media programs scheduled to be recorded by the local DVR system at any given time during the presentation time period, determining the relative priority of the media programs based on a user watch history, and/or determining the relative priority of the media programs based on recency data (e.g., how long ago the user scheduled the recording of each of the media programs).

A content type characteristic of a media program may include any characteristic of a media program and/or a media stream that includes the media program. For example, a content type characteristic may include information identifying a type of stream as a live event stream, a new episode stream, a repeated episode stream, a new movie stream, a regular movie stream (e.g., not a new movie stream), a pay-per-view stream, a video-on-demand stream, etc. These examples are illustrative only. Additional or alternative content type characteristics may be determined by DVR management facility 204 in other implementations. DVR management facility 204 may prioritize the content type characteristics in any suitable manner with respect to each other to facilitate prioritizing the media programs. For example, a new episode stream may be prioritized over a repeated episode stream and a new movie stream may be prioritized over a regular movie stream. In certain examples, the content type characteristics may have a predefined order of priority. To illustrate, in certain examples, DVR management facility 204 may prioritize the content type characteristics in the following order of decreasing priority: live events; new episodes; new movies; repeated episodes; and regular movies.

A user watch history may include any information regarding a user's consumption of media programs. For example, a user watch history may indicate what types of media programs (e.g., genre, category, etc.) the user typically consumes, when the user typically consumes the media programs, whether the user has consumed particular media programs previously, and/or any other suitable information. DVR management facility 204 may access the user watch history from any suitable source and in any suitable manner. In certain examples, storage facility 206 may maintain user watch history information as part of detection data 208 to be used for any suitable purpose, such as described herein.

In examples where the conflict is associated with a maximum local data storage capacity, the prioritization operation may include, for example, determining whether a relatively lower definition version (e.g., a standard definition ("SD") version as opposed to a high definition ("HD") version) of the media program is available, determining, based on a user watch history, whether at least one media program already stored in the memory of the local DVR system has not been consumed (e.g., viewed) by the user, determining, based on the user watch history, which of the media programs already stored in the memory of the local DVR system have a relatively lower priority to the user, determining the relative priority based on a user profile associated with the local DVR system, and/or determining how long each of the media programs have been stored in the memory of the local DVR system.

DVR management facility 204 may determine the relative priority based on a user profile in any suitable manner. For example, media programs that are recorded by a plurality of user profiles associated with the local DVR system may be prioritized over media programs that were recorded by only one user profile. Additionally or alternatively, media programs recorded by certain user profiles may have a higher priority than media programs recorded by other user profiles. For example, media programs recorded by a user profile of a parent may have a higher priority than media programs recorded by a user profile of a child.

In certain examples, DVR management facility 204 may perform at least one prioritization operation included in a series of sequential prioritization operations to determine a relative priority of media programs that are at least one of scheduled to be recorded by the local DVR system at any given time during the presentation time period and currently recorded in a memory of the local DVR system. For example, DVR management facility 204 may perform a first prioritization operation included in the series of sequential prioritization operations to determine a first relative priority of the media programs. After DVR management facility 204 performs the first prioritization operation, DVR management facility 204 may determine that the first prioritization operation does not result in a prioritization that will facilitate resolving the conflict and recording the media program. In response to the determination that the first prioritization operation does not result the prioritization that will facilitate resolving the conflict and recording the media program, DVR management facility 204 may perform a second prioritization operation to determine a second relative priority of the media programs. In certain examples, DVR management facility 204 may determine that the second prioritization operation does not result in a prioritization that will facilitate resolving the conflict and recording the media program. In response to the determination that the second prioritization operation does not result the prioritization that will facilitate resolving the conflict and recording the media program, DVR management facility 204 may perform a third prioritization operation to determine a third relative priority of the media programs. DVR management facility 204 may perform as many prioritization operations (e.g., a fourth prioritization operation, a fifth prioritization operation, etc.) as may suit a particular implementation.

In certain examples, DVR management facility 204 may refrain from performing additional prioritization operations included in the series of sequential prioritization operations when the first prioritization operation facilitates resolving the conflict and recording the media program. Exemplary series of sequential prioritization operations are described herein.

In certain examples, DVR management facility 204 may perform the prioritization operation based on a combination of a plurality of weighted values associated with media programs. For example, DVR management facility 204 may assign a plurality of weighted values to each of the media programs that are at least one of scheduled to be recorded by the local DVR system at any given time during the presentation time period and currently recorded in the memory of the local DVR system. The plurality of weighted values may be associated with any of the prioritization operations described herein. DVR management facility 204 may assign the plurality of weighted values in any suitable manner. For example, DVR management facility 204 may assign a first weighted value, a second weighted value, and a third weighted value to a first media program. In addition, DVR management facility 204 may assign a fourth weighed value, a fifth weighted value, and a sixth weighted value to a second media program. After DVR management facility 204 assigns the plurality of weighted values, DVR management facility 204 may sum the plurality of weighted values of each media program included in the media programs to determine a cumulative priority value for each of the media programs. Based on the sum of the plurality of weighted values, DVR management facility 204 may determine that the first media program included in the media programs has a relatively lower cumulative priority value than the second media program.

Based on the prioritization operation, DVR management facility 204 may automatically perform a predetermined action to resolve the conflict and facilitate the local DVR system recording the media program. DVR management facility 204 may automatically perform a predetermined action in any suitable manner. As used herein, "automatically perform" means that the predetermined action is performed without requiring additional input from the user (e.g., without the user having to select a scheduled stream to cancel and/or without the user having to select one or more media programs to delete from the memory of the local DVR system). In certain examples, DVR management facility 204 may automatically perform the predetermined action to resolve the conflict without providing a notification to the user.

DVR management facility 204 may automatically perform the predetermined action at any suitable time. In certain examples, DVR management facility 204 may automatically perform the predetermined action immediately upon receipt of the request from the user to record the media program and identification of a conflict. Alternatively, DVR management facility 204 may automatically perform the predetermined action at any time prior to the scheduled recording time of the media program (i.e., prior to the presentation time period). In certain examples, DVR management facility 204 may wait until the presentation time period is about to begin before DVR management facility 204 performs the predetermined action.

The predetermined action may include any action that facilitates recording of the media program by the local DVR system. For example, the predetermined action may include canceling a scheduled recording of one or more media programs, rescheduling a scheduled recording of one or more media programs, finding a different version (e.g., an SD version instead of an HD version) of the media program, and/or deleting one or more media programs currently stored in a memory of local DVR system 104. These predetermined actions are illustrative only. Other predetermined actions may be automatically performed by DVR management facility 204 in other implementations.

Figure 5:
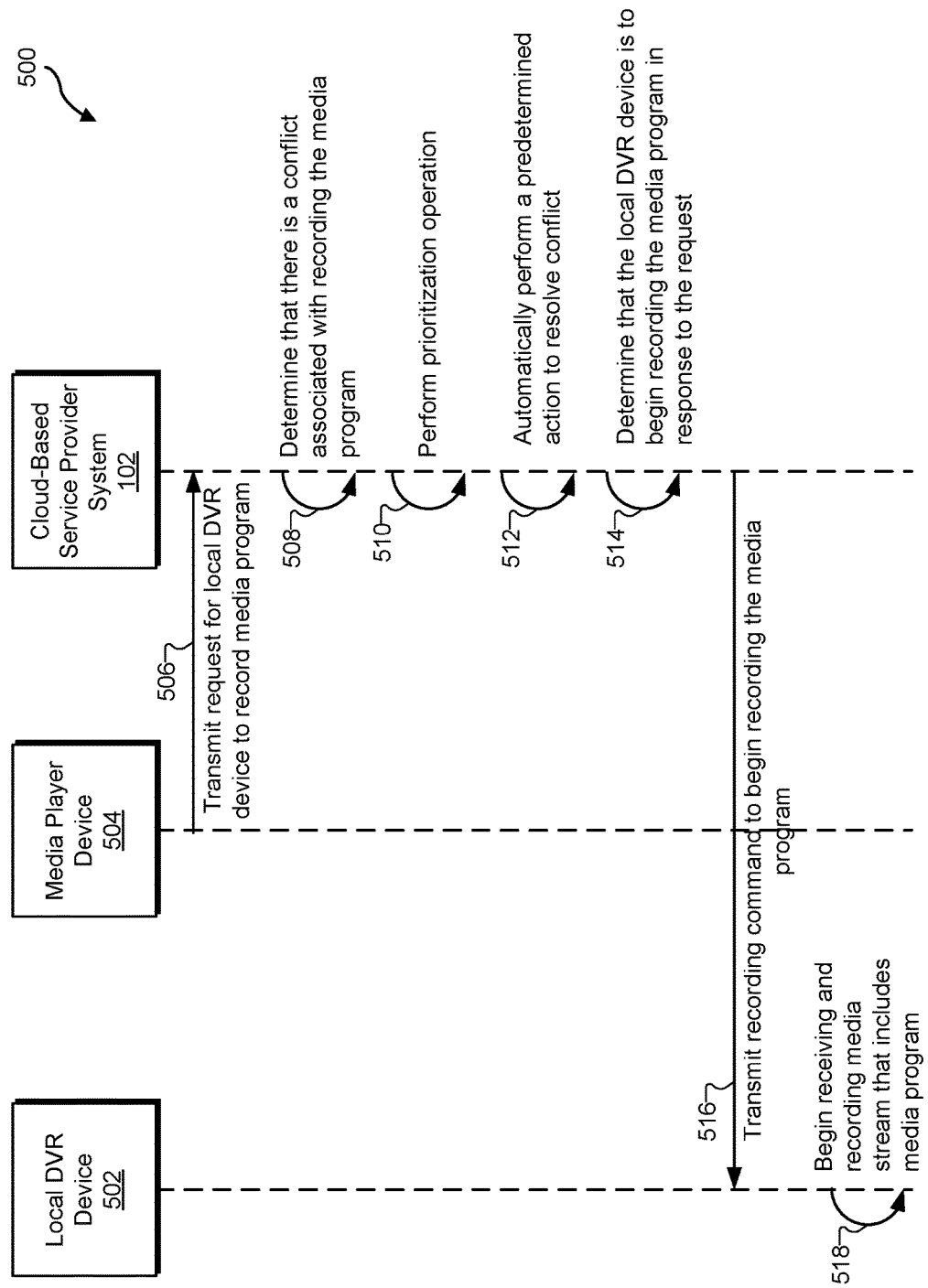
FIG. 5 shows an exemplary sequence diagram according to principles described herein.

FIG. 5 shows an exemplary sequence diagram 500 that illustrates a scenario in which a user provides an input command representative of a request for a local DVR device 502 included in a local DVR system (e.g., local DVR system 104) to record a media program provided by a television service. In this example, the request is received by a media player device 504, which transmits the request to cloud-based service provider system 102 (step 506). It will be recognized that cloud-based service provider system 102 may alternatively detect the request in any other suitable manner.

In step 508, cloud-based service provider system 102 determines whether there is a conflict associated with the recording of the media program in response to receiving the request transmitted in step 506. Cloud-based service provider system 102 may determine whether there is a conflict in any of the ways described herein.

In step 510, cloud-based service provider system 102 performs a prioritization operation. Cloud-based service provider system 102 may perform the prioritization operation in any of the ways described herein.

In step 512, cloud-based service provider system 102 automatically performs a predetermined action to resolve the conflict. Step 512 may be performed in any suitable manner.

In step 514, cloud-based service provider system 102 determines that local DVR device 502 is to begin recording the media program in response to the request. Step 514 may be performed in any suitable manner.

In step 516, cloud-based service provider system 102 transmits a recording command to local DVR device 502 for local DVR device 502 to begin (e.g., immediately begin) recording the media program. Step 516 may be performed in any suitable manner.

In step 518 and in response to receiving the recording command, local DVR device 502 begins receiving and recording the media stream that includes the media program. For example, local DVR device 502 may tune to a channel that carries the media stream and/or otherwise begin receiving and recording the media stream as may serve a particular implementation.

Figure 6:
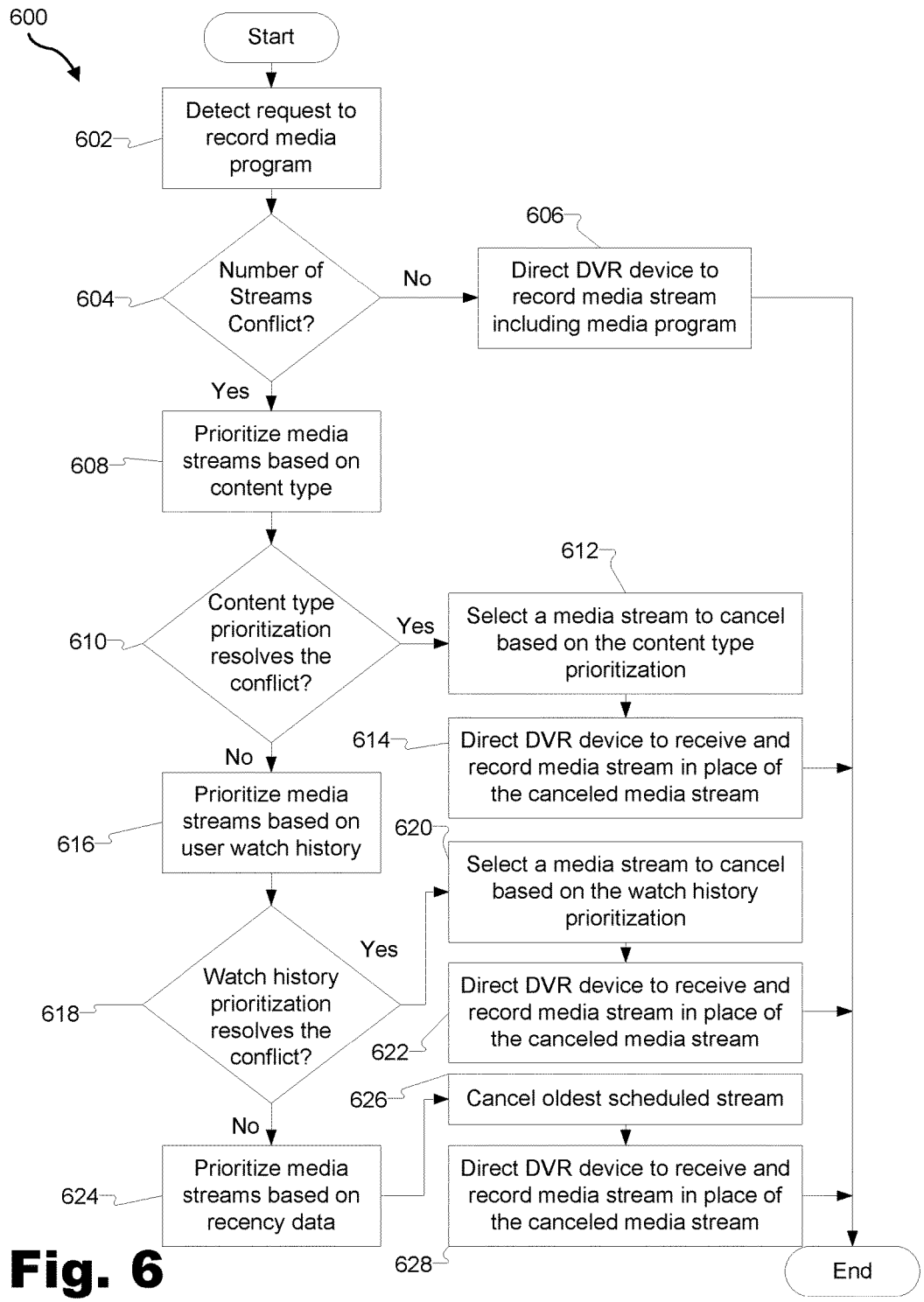
FIGS. 6-8 show flow charts that illustrate exemplary prioritization operations according to principles described herein.

FIG. 6 shows a flow chart 600 that illustrates an exemplary prioritization operation that may be used to select a media stream included in a plurality of media streams to cancel so that the local DVR system (e.g., local DVR system 104) may receive and record a different media stream in place of the canceled media stream. While FIG. 6 illustrates exemplary steps according to one embodiment, other embodiments may omit, add to, reorder, and/or modify any of the steps shown in FIG. 6. One or more of the steps shown in FIG. 6 may be performed by cloud-based service provider system 102 and/or any implementation thereof.

In step 602, detection facility 202 detects a request for a local DVR device included in the local DVR system at an end-user premises (e.g., end-user premises 114) to record a media program. The request may be detected in any of the ways described herein.

In decision block 604, DVR management facility 204 determines whether there is a number of streams conflict associated with the request to record the media program. For example, DVR management facility 204 may determine that a DVR device and/or one or more other media player devices located at the user premises are already receiving and recording a maximum number of media streams that are allowed to be concurrently recorded based on a maximum-number-of-streams limitation of a router (e.g., router 110) and/or the local DVR system.

If there is not a number of streams conflict when the request is detected (No; decision block 604), DVR management facility 204 directs the local DVR device to receive and record the media stream including the media program that is the subject of the request (step 606).

If there is a number of streams conflict when the request is detected (Yes; decision block 604), DVR management facility 204 prioritizes the media streams scheduled to be recorded during the presentation period based on content type (step 608). For example, DVR management facility 204 may identify a content type for each of the media streams scheduled to be recorded during the presentation time period and prioritize the media streams according to a predefined content type characteristic priority order, such as described herein.

In decision block 610, DVR management facility 204 determines whether the content type prioritization is sufficient to resolve the conflict. For the content type prioritization to be sufficient to resolve the conflict, at least one media program included in the media streams scheduled to be recorded during the presentation time period has to have a relatively lower priority than the other media programs included in the media streams scheduled to be recorded during the presentation time period.

If the content type prioritization is sufficient to resolve the conflict (Yes: decision block 610), DVR management facility 204 selects a media stream to cancel that has a relatively lower priority. For example, six media programs may already be scheduled to be recorded during the presentation time period when the request is detected. Five of the six media programs may correspond to live sporting events and one of the six media programs may correspond to a repeated episode of a television program. Because the repeated episode program has a lower priority than a live event, DVR management facility 204 may select to cancel the media stream that includes the repeated episode of the television program. DVR management facility 204 may then direct the local DVR device to receive and record the media stream that includes the requested media program in place of the canceled media stream (step 614).

If the content type prioritization is not sufficient to resolve the conflict (No; decision block 610), DVR management facility 204 prioritizes the media streams scheduled to be recorded during the presentation time period based on a user watch history (step 616). For example, the user watch history may indicate that the user watches and records more sports programs than movies and/or other types of content. Accordingly, based on such a user watch history, DVR management facility 204 may assign a higher priority to sports programs than the other types of content.

In decision block 618, DVR management facility 204 determines whether the watch history prioritization is sufficient to resolve the conflict by determining whether at least one of the media streams scheduled to be recorded during the presentation time period has a relatively lower priority than the other media streams.

If the watch history prioritization is sufficient to resolve the conflict (Yes; decision block 618), DVR management facility 204 selects a media stream to cancel that has a relatively lower priority (step 620). For example, DVR management facility 204 may select a stream that includes an episode of a television show to cancel if the user watch history indicates that the user watches and records more sports programs than episodic media programs. DVR management facility 204 then directs the local DVR device to receive and record the media stream that includes the requested media program in place of the canceled media stream (step 622).

If the watch history prioritization is not sufficient to resolve the conflict (No; decision block 618), DVR management facility 204 prioritizes the media streams based on recency data (step 624). For example, DVR management facility 204 may assign a relatively lower priority to media programs that were scheduled to be recorded a week ago than media programs that were scheduled to be recorded yesterday.

In step 626, DVR management facility 204 cancels the oldest scheduled stream (i.e., the stream with the longest time period between when the user requested to record the media program included in the stream and the presentation time period) in order to facilitate recording of the media program during the presentation time period. DVR management facility 204 then directs the local DVR device to receive and record the media stream including the requested media program in place of the canceled media stream (step 628).

Figure 7:
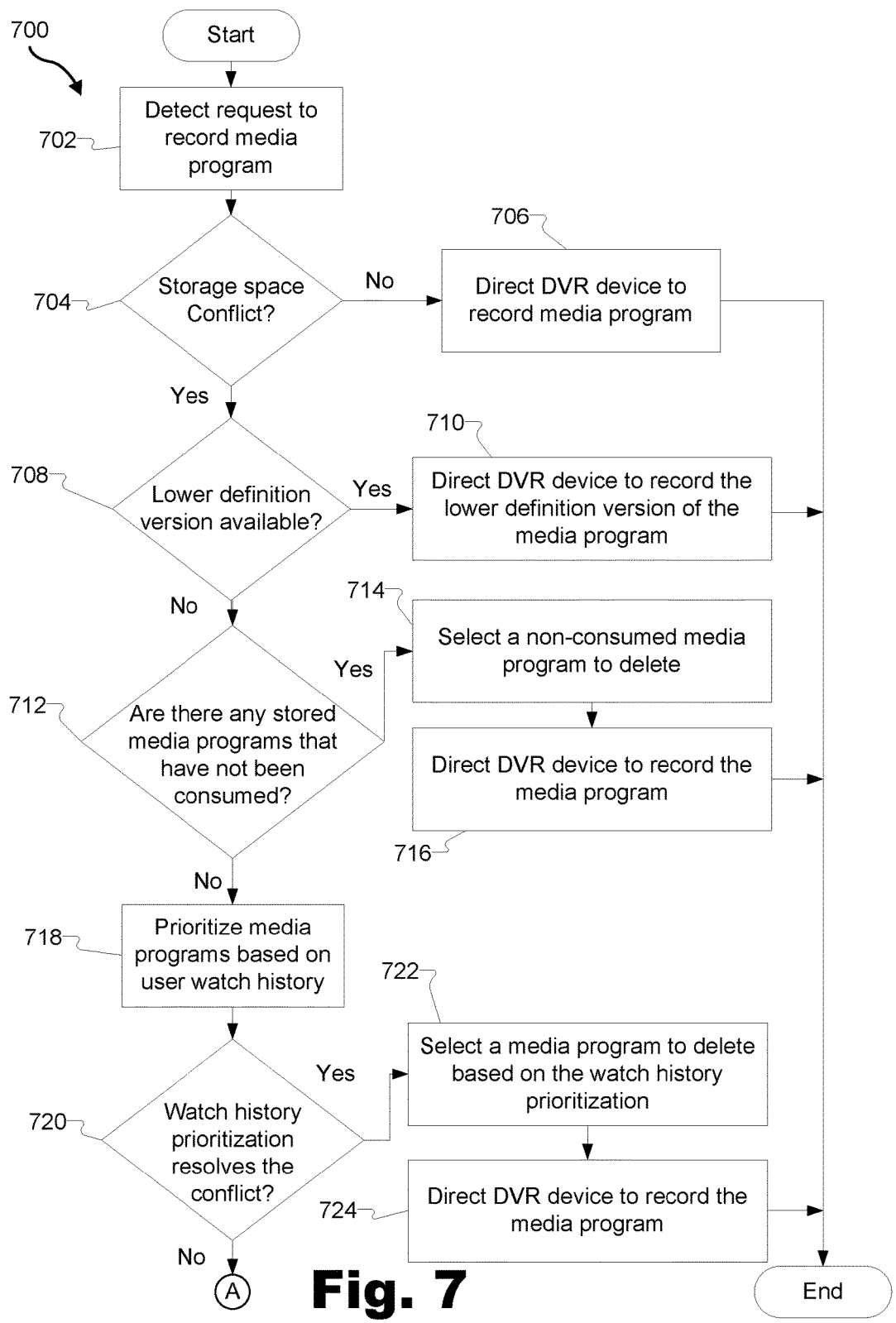

FIG. 7 shows a flow chart 700 that illustrates an exemplary prioritization operation that may be used to select a media program stored in a memory of a local DVR device to delete so that the local DVR device has sufficient storage space in the memory to record a requested media program. While FIG. 7 illustrates exemplary steps according to one embodiment, other embodiments may omit, add to, reorder, and/or modify any of the steps shown in FIG. 7. One or more of the steps shown in FIG. 7 may be performed by cloud-based service provider system 102 and/or any implementation thereof.

In step 702, detection facility 202 detects a request for a local DVR device included in a local DVR system at an end-user premises to record a media program. The request may be detected in any of the ways described herein.

In decision block 704, DVR management facility 204 determines whether there is a storage space conflict associated with the request to record the media program, which occurs when the local DVR device does not or will not have sufficient storage space to store the media program that is the subject of the request. This may be accomplished in any of the way described herein.

If there is not a storage space conflict (No; decision block 704), DVR management facility 204 directs the local DVR device to record the media program (step 706).

If there is a storage space conflict (Yes; decision block 704), DVR management facility 204 determines in decision block 708 whether there is a lower definition version (e.g., an SD version) of the media program that is available and that, when recorded, will not exceed a maximum storage capacity of the local DVR device.

If there is a lower definition version of the media program available (Yes; decision block 708) that will not exceed the maximum storage capacity of the local DVR device, DVR management facility 204 directs the local DVR device to record the lower definition version of the media program (step 710).

If there is not a lower definition version of the media program available (No; decision block 708), DVR management facility 204 determines in decision block 712 whether there are any media programs already stored in the memory of the local DVR device that have not been consumed (e.g., viewed, heard, etc.) by the user.

If there is a media program already stored in the memory of the local DVR device that the user has not consumed (Yes; decision block 712), DVR management facility 204 directs the local DVR device to delete the non-consumed media program (step 714). If deleting the non-consumed media program frees up sufficient storage space to store the media program, DVR management facility 204 directs the local DVR device to record the media program (step 716).

If there are no media programs already stored in the memory of the local DVR device that the user has not consumed (No; decision block 712) or if the deleting of the media program in step 714 does not free up enough storage space, DVR management facility 204 prioritizes the media programs stored in the memory based on the user watch history (step 718). DVR management facility 204 may prioritize the media programs based on the user watch history in any of the ways described herein.

In decision block 720, DVR management facility 204 determines whether the watch history prioritization is sufficient to resolve the conflict by determining whether at least one of the media programs already recorded in the memory of the local DVR device has a relatively lower priority than the other recorded media programs and whether deleting the at least one of the media programs from the memory of the local DVR device will free up sufficient memory to record the media program.

If the watch history prioritization is sufficient to resolve the conflict (Yes; decision block 722), DVR management facility 204 selects at least one media program to delete that has a relatively lower priority (step 722). DVR management facility 204 may then direct the local DVR device to record the media program during the presentation time period (step 724).

Figure 8:
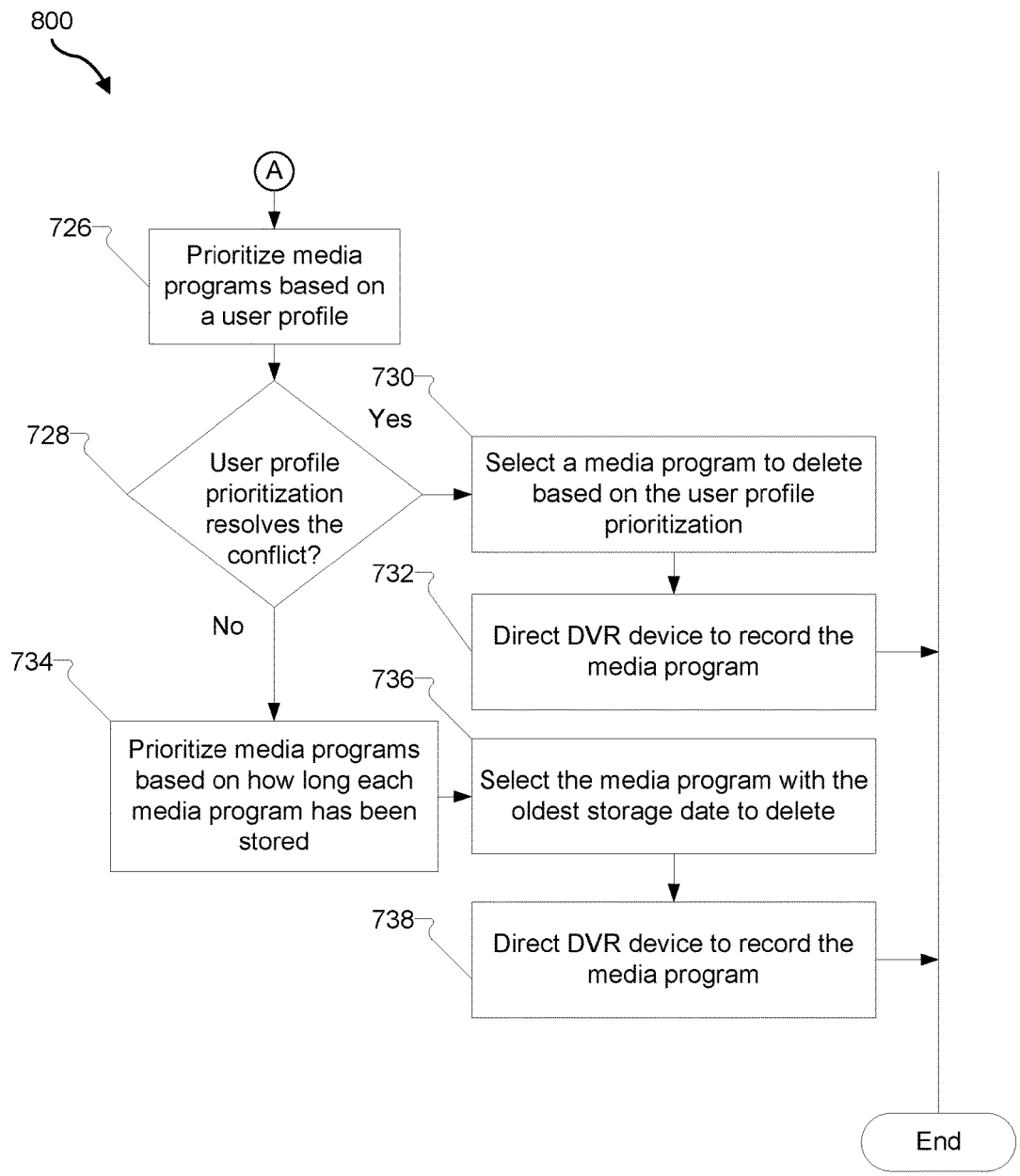

If the watch history prioritization is not sufficient to resolve the conflict (No; decision block 720), flow chart 700 continues as flow chart 800 in FIG. 8. In step 726 DVR management facility 204 prioritizes the media programs stored in the memory of the local DVR device based on one or more user profiles. DVR management facility 204 may prioritize the media programs based on one or more user profiles in any suitable manner, such as described herein.

In decision block 728, DVR management facility 204 determines whether the user profile prioritization resolves the conflict.

If the user profile prioritization resolves the conflict (Yes; decision 728), DVR management facility 204 selects at least one media program to delete based on the user profile prioritization (step 730) and directs the local DVR device to record the media program (step 732).

If the user profile prioritization does not resolve the conflict (No; decision 728), DVR management facility 204 prioritizes the media programs based on how long each media program has been stored in the memory of the local DVR device (step 734). For example, media programs having the oldest storage date may be prioritized lower than media programs having more recent storage dates.

In step 736, DVR management facility 204 selects the media program with the oldest storage date to delete. Step 736 may be repeated as many times as necessary to free enough space in the memory of the local DVR device to store the requested media program.

Once sufficient space is available to record the requested media program, DVR management facility 204 directs the local DVR device to record the media program (step 738).

The exemplary flow charts shown in FIGS. 6-8 are provided for illustrative purposes only. It is understood that additional and/or different steps, prioritization operations, etc. may be employed in certain implementations.

The examples described above are presented within the context of a request to record a media program. However, one of ordinary skill in the art would understand that one or more of the principles described herein may also be applied to automatically resolve conflicts associated with other types of requests. For example, DVR management facility 204 may receive a request from a user of a media player device to present (e.g., immediately) a media program by way of the media player device. At the time that DVR management facility 204 receives the request, the local DVR system may already be receiving the maximum number of streams allowed (e.g., based on a maximum-number-of-streams limitation of router 110). For example, three additional media player devices located at the user premises (e.g., in different rooms) may already be concurrently receiving media programs and the local DVR device may already be concurrently recording three media programs when the request is received. Based on the number of media streams already being recorded/received by the local DVR system, DVR management facility 204 may determine that there is a maximum-number-of-streams conflict. DVR management facility 204 may perform one or more prioritization operations, such as those described herein, and automatically perform any suitable predetermined action to resolve the conflict and facilitate the media player device accessing and presenting the media program to the user.

Figure 9:
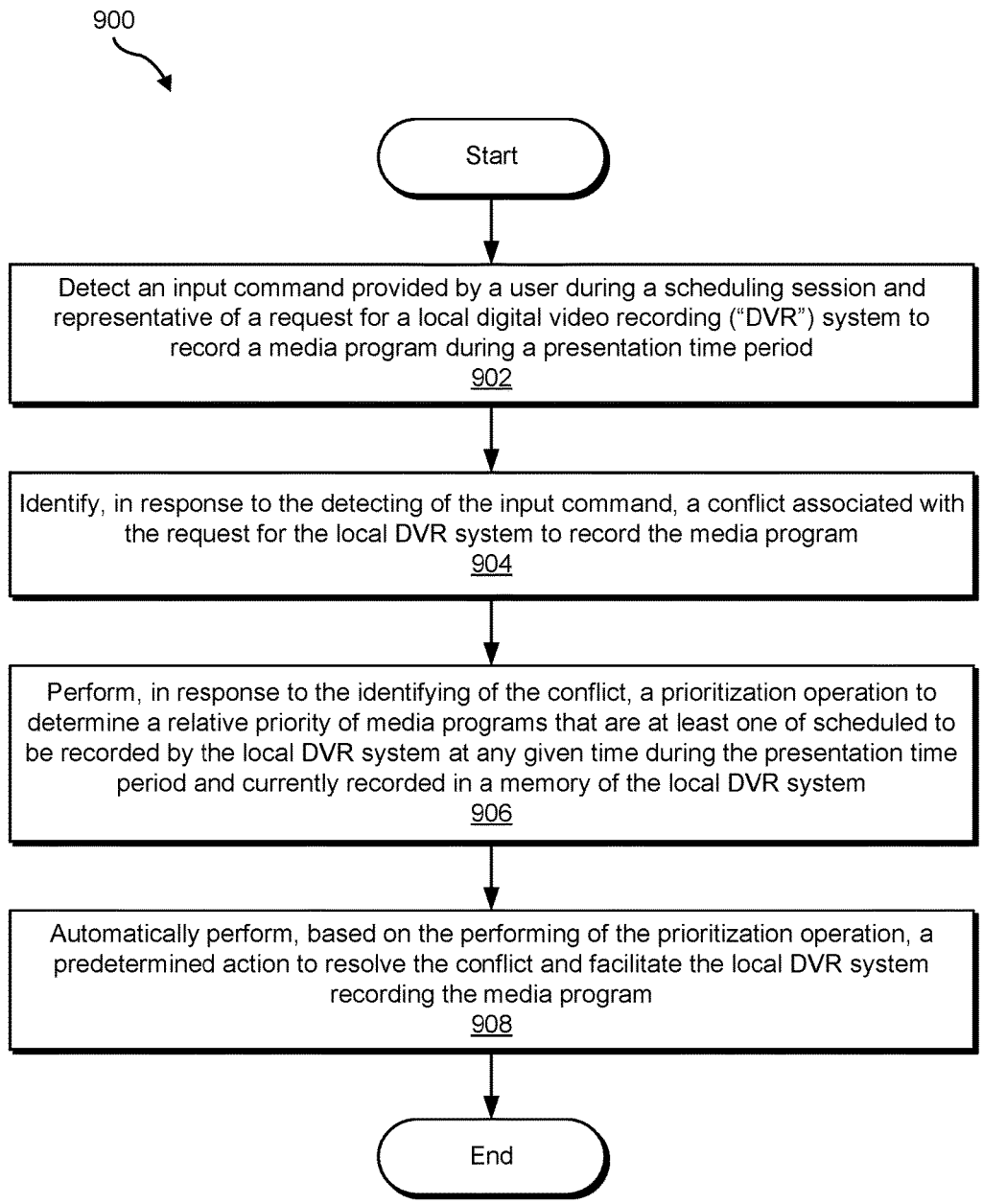
FIGS. 9-10 illustrate exemplary methods for resolving recording conflicts in a hybrid cloud-local DVR system according to principles described herein.
Figure 10:
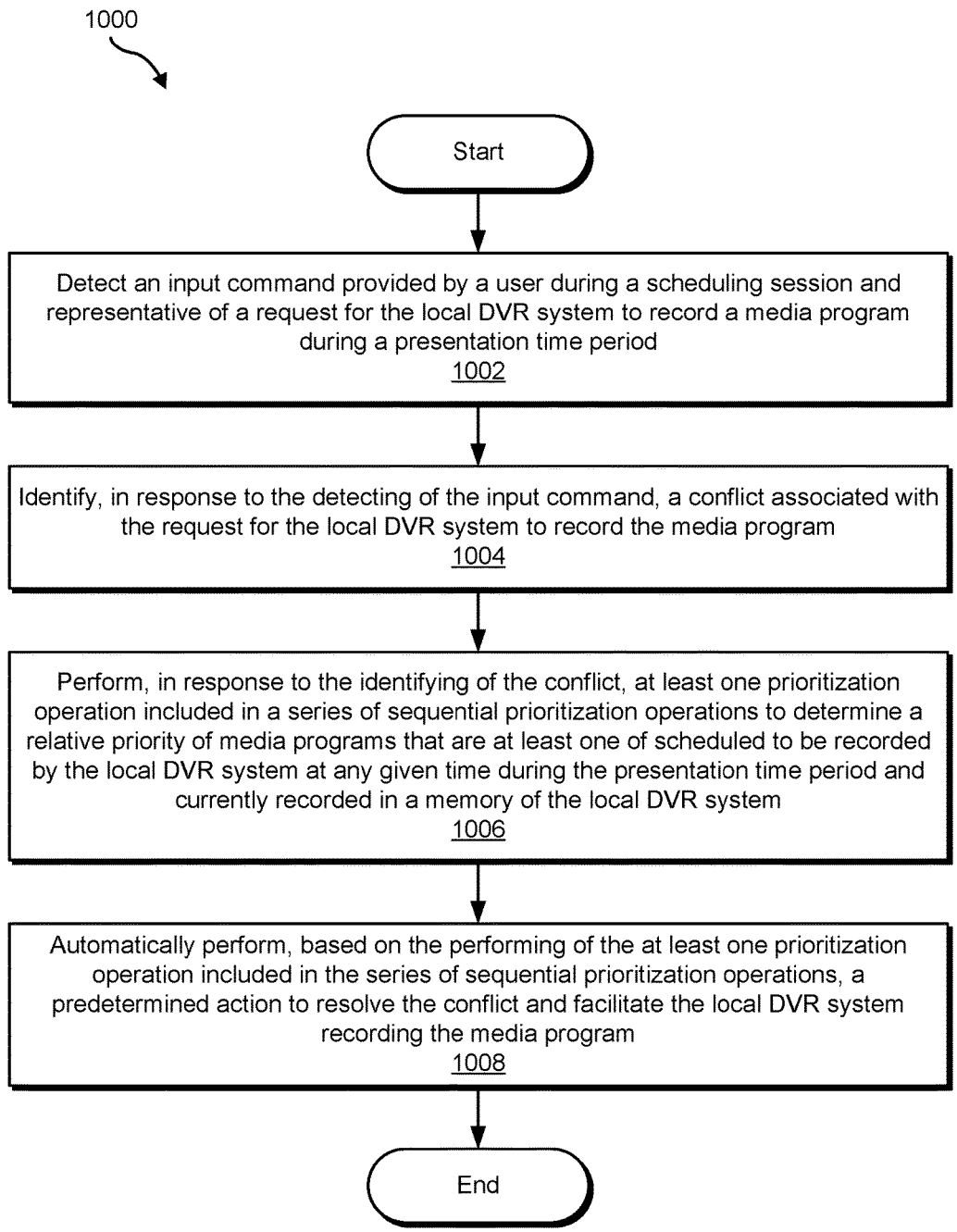

FIGS. 9-10 illustrate exemplary methods 900 and 1000 for resolving recording conflicts in a hybrid cloud-local DVR system. While FIGS. 9-10 illustrate exemplary operations according to certain embodiments, other embodiments may omit, add to, reorder, and/or modify any of the operations shown in FIGS. 9-10. One or more of the operations shown in FIGS. 9-10 may be performed by cloud-based service provider system 102 and/or any implementation thereof.

Turning to FIG. 9, in operation 902, a system (e.g., cloud-based service provider system 102) detects an input command provided by a user during a scheduling session and representative of a request for the local DVR system to record a media program during a presentation time period. Operation 902 may be performed in any of the ways described herein.

In operation 904, the system identifies, in response to the detecting of the input command, a conflict associated with the request for the local DVR system to record the media program. Operation 904 may be performed in any of the ways described herein.

In operation 906, the system performs, in response to the identifying of the conflict, a prioritization operation to determine a relative priority of media programs that are at least one of scheduled to be recorded by the local DVR system at any given time during the presentation time period and currently recorded in a memory of the local DVR system. Operation 906 may be performed in any of the ways described herein.

In operation 908, the system automatically performs, based on the performing of the prioritization operation, a predetermined action to resolve the conflict and facilitate the local DVR system recording the media program. Operation 908 may be performed in any of the ways described herein.

Turning to FIG. 10, in operation 1002, a system (e.g., cloud-based service provider system 102) detects an input command provided by a user during a scheduling session and representative of a request for a local DVR system to record a media program during a presentation time period. Operation 1002 may be performed in any of the ways described herein.

In operation 1004, the system identifies in response to the detecting of the input command, a conflict associated with the request for the local DVR system to record the media program. Operation 1004 may be performed in any of the ways described herein.

In operation 1006, the system performs, in response to the identifying of the conflict, at least one prioritization operation included in a series of sequential prioritization operations to determine a relative priority of media programs that are at least one of scheduled to be recorded by the local DVR system at any given time during the presentation time period and currently recorded in a memory of the local DVR system. Operation 1006 may be performed in any of the ways described herein.

In operation 1008, the system automatically performs, based on the performing of the at least one prioritization operation included in the series of sequential prioritization operations, a predetermined action to resolve the conflict and facilitate the local DVR system recording the media program. Operation 1008 may be performed in any of the ways described herein.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), erasable programmable read-only memory ("EPROM"), electrically erasable programmable read-only memory ("EEPROM"), a Flash EEPROM device, any other memory chip or cartridge, or any other tangible medium from which a computer can read.

Figure 11:
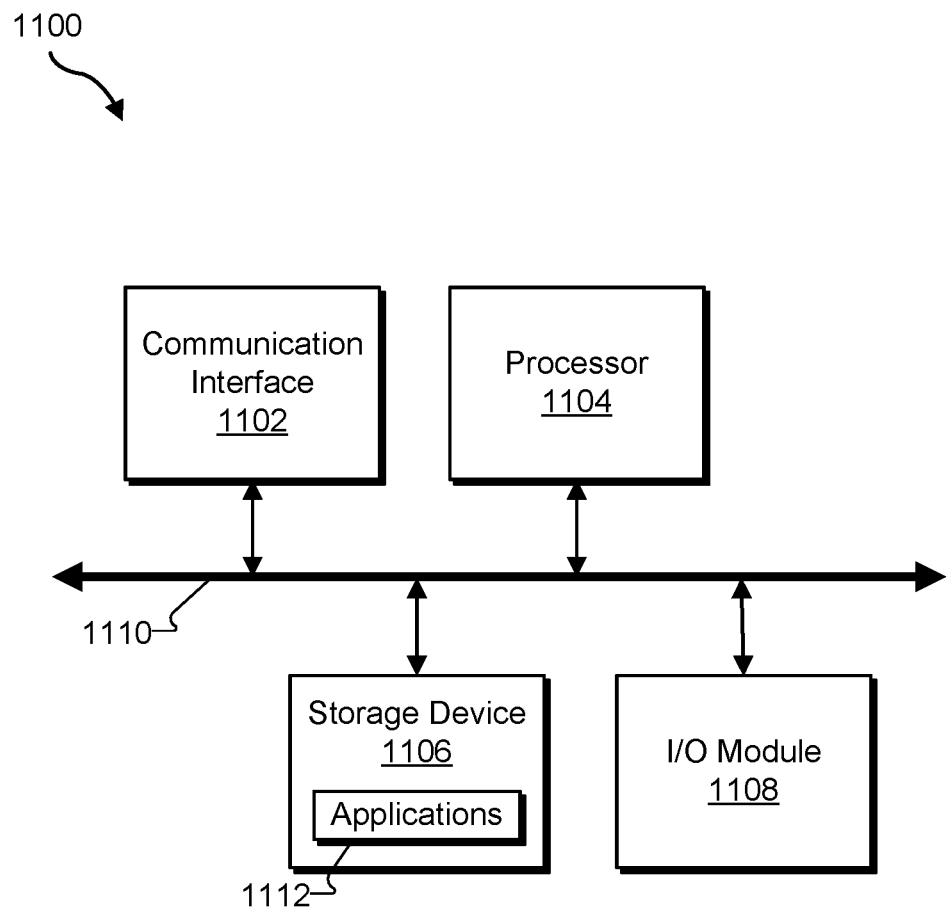
FIG. 11 illustrates an exemplary computing device according to principles described herein.

FIG. 11 illustrates an exemplary computing device 1100 that may be specifically configured to perform one or more of the processes described herein. As shown in FIG. 11, computing device 1100 may include a communication interface 1102, a processor 1104, a storage device 1106, and an input/output ("I/O") module 1108 communicatively connected via a communication infrastructure 1110. While an exemplary computing device 1100 is shown in FIG. 11, the components illustrated in FIG. 11 are not intended to be limiting. Additional or alternative components may be used in other embodiments. Components of computing device 1100 shown in FIG. 11 will now be described in additional detail.

Communication interface 1102 may be configured to communicate with one or more computing devices. Examples of communication interface 1102 include, without limitation, a wired network interface (such as a network interface card), a wireless network interface (such as a wireless network interface card), a modem, an audio/video connection, and any other suitable interface.

Processor 1104 generally represents any type or form of processing unit capable of processing data or interpreting, executing, and/or directing execution of one or more of the instructions, processes, and/or operations described herein. Processor 1104 may direct execution of operations in accordance with one or more applications 1112 or other computer-executable instructions such as may be stored in storage device 1106 or another computer-readable medium.

Storage device 1106 may include one or more data storage media, devices, or configurations and may employ any type, form, and combination of data storage media and/or device. For example, storage device 1106 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 1106. For example, data representative of one or more executable applications 1112 configured to direct processor 1104 to perform any of the operations described herein may be stored within storage device 1106. In some examples, data may be arranged in one or more databases residing within storage device 1106.

I/O module 1108 may be configured to receive user input and provide user output and may include any hardware, firmware, software, or combination thereof supportive of input and output capabilities. For example, I/O module 1108 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1108 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1100. For example, one or more applications 1112 residing within storage device 1106 may be configured to direct processor 1104 to perform one or more processes or functions associated with detection facility 202 and DVR management facility 204. Likewise, storage facility 206 may be implemented by or within storage device 1106.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    detecting, by a cloud-based service provider system remote from and in communication with a local digital video recording ("DVR") system by way of a network, an input command provided by a user during a scheduling session and representative of a request for the local DVR system to record a media program during a presentation time period;
    identifying, by the cloud-based service provider system in response to the detecting of the input command, a conflict associated with the request for the local DVR system to record the media program, the conflict comprising a maximum storage space conflict in which a maximum amount of storage space of the local DVR system will be exceeded as a result of the recording of the media program;
    performing, by the cloud-based service provider system in response to the identifying of the conflict, a first prioritization operation to determine a first relative priority of media programs that are at least one of scheduled to be recorded by the local DVR system at any given time during the presentation time period and currently recorded in a memory of the local DVR system, the first prioritization operation including determining whether a relatively lower definition version of the media program is available;
    determining, by the cloud-based service provider system after the performing of the first prioritization operation, that the maximum amount of storage space of the local DVR system will still be exceeded as a result of the recording of the relatively lower definition version of the media program and that the first prioritization operation does not result in a prioritization of the media programs that will facilitate resolving the conflict and recording the media program;
    performing, by the cloud-based service provider system in response to the determining that the first prioritization operation does not result in the prioritization of the media programs that will facilitate resolving the conflict and recording the media program, a second prioritization operation to determine a second relative priority of the media programs, the second prioritization operation including determining whether there are any media programs already stored in the memory of the local DVR system that the user has not watched;
    determining, by the cloud-based service provider system after the performing of the second prioritization operation, that the maximum amount of storage space of the local DVR system will still be exceeded as a result of deleting one or more media programs that the user has not watched and that the second prioritization operation does not result in a prioritization of the media programs that will facilitate resolving the conflict and recording the media program;
    performing, by the cloud-based service provider system in response to the determining that the second prioritization operation does not result in the prioritization of the media programs that will facilitate resolving the conflict and recording the media program, a third prioritization operation to determine a third relative priority of the media programs; and
    automatically performing, by the cloud-based service provider system based on the performing of the third prioritization operation and without requiring additional input from the user, a predetermined action to resolve the conflict and facilitate the local DVR system recording the media program.

2. The method of claim 1, further comprising:
    identifying, by the cloud-based service provider system, a maximum number of media programs other than the media program and that are already scheduled to be concurrently recorded by the local DVR system at any given time during the presentation time period; and
    determining, by the cloud-based service provider system, whether the maximum number of media programs that are already scheduled to be concurrently recorded by the local DVR system at any given time during the presentation time period equals a maximum-number-of-streams limitation of at least one of the local DVR system and an end-user premises network router communicatively coupled to the local DVR system;
    wherein the automatically performing of the predetermined action includes automatically canceling at least one of the media programs that are scheduled to be concurrently recorded based on the determined relative priority of the media programs.

3. The method of claim 2, wherein the performing of one of the first prioritization operation, the second prioritization operation, and the third prioritization operation further comprises at least one of:
    determining the relative priority based on a content type characteristic of each of the media programs scheduled to be recorded by the local DVR system at any given time during the presentation time period;
    determining the relative priority of the media programs based on a user watch history associated with the media programs; and
    determining the relative priority of the media programs based on when the user scheduled the recording of each of the media programs.

4. The method of claim 1,
    wherein the automatically performing of the predetermined action includes automatically deleting, based on the performing of the third prioritization operation, one or more of the media programs already stored in the memory of the local DVR system.

5. The method of claim 4, wherein the performing of one of the first prioritization operation, the second prioritization operation, and the third prioritization operation further comprises at least one of:

determining, based on the user watch history, which of the media programs already stored in the memory of the local DVR system have a relatively lower priority to the user;

determining the relative priority based on a user profile associated with the local DVR system; and determining how long each of the media programs have been stored in the memory of the local DVR system.

6. The method of claim 1, wherein the performing of one of the first prioritization operation, the second prioritization operation, and the third prioritization operation further comprises:

assigning a plurality of weighted values to each of the media programs that are at least one of scheduled to be recorded by the local DVR system at any given time during the presentation time period and currently recorded in the memory of the local DVR system;

summing the plurality of weighted values of each media program included in the media programs to determine a cumulative priority value for each of the media programs; and determining that a particular media program included in the media programs has a relatively lower cumulative priority value than a remainder of the media programs;

wherein the automatically performing of the predetermined action includes one of canceling a scheduled recording of the particular media program and deleting the particular media program from the memory of the local DVR system.

7. The method of claim 1, embodied as computer-executable instructions on at least one non-transitory computer-readable medium.

8. A method comprising:

detecting, by a cloud-based service provider system remote from and in communication with a local digital video recording ("DVR") system by way of a network, an input command provided by a user during a scheduling session and representative of a request for the local DVR system to record a media program during a presentation time period;

identifying, by the cloud-based service provider system in response to the detecting of the input command, a conflict associated with the request for the local DVR system to record the media program;

performing, by the cloud-based service provider system in response to the identifying of the conflict, a series of sequential prioritization operations to determine a relative priority of media programs that are at least one of scheduled to be recorded by the local DVR system at any given time during the presentation time period and currently recorded in a memory of the local DVR system, the series of sequential prioritization operations including a plurality of prioritization operations that are arranged in a predefined order and are configured to be performed sequentially in turn until the conflict is resolved; and automatically performing, by the cloud-based service provider system based on the performing of the series of sequential prioritization operations, a predetermined action to resolve the conflict and facilitate the local DVR system recording the media program, wherein the series of sequential prioritization operations, arranged in the predefined order, includes:

a first prioritization operation that includes determining whether a relatively lower definition version of the media program is available;

a second prioritization operation that includes determining whether there are any media programs already stored in the memory of the local DVR system that the user has not watched;

a third prioritization operation that is based on a user watch history associated with the media programs;

a fourth prioritization operation that is based on a relative priority of one or more user profiles associated with the local DVR system; and a fifth prioritization operation that is based on how long each of the media programs have been stored in the memory of the local DVR system.

9. The method of claim 8, wherein the performing of the series of sequential prioritization operations comprises:

performing the first prioritization operation included in the series of sequential prioritization operations to determine a first relative priority of the media programs;

determining that the first prioritization operation does not result in a prioritization that will facilitate resolving the conflict and recording the media program; and performing, in response to the determining that the first prioritization operation does not result in the prioritization that will facilitate resolving the conflict and recording the media program, the second prioritization operation to determine a second relative priority of the media programs.

10. The method according to claim 9, wherein the performing of the series of sequential prioritization operations further comprises:

determining that the second prioritization operation does not result in a prioritization that will facilitate resolving the conflict and recording the media program; and performing, in response to the determining that the second prioritization operation does not result in the prioritization that will facilitate resolving the conflict and recording the media program, the third prioritization operation to determine a third relative priority of the media programs.

11. The method of claim 10, wherein the performing of the series of sequential prioritization operations further comprises:

determining that the third prioritization operation does not result in a prioritization that will facilitate resolving the conflict and recording the media program; and performing, in response to the determining that the third prioritization operation does not result in the prioritization that will facilitate resolving the conflict and recording the media program, the fourth prioritization operation to determine a fourth relative priority of the media programs.

12. The method of claim 11, wherein the performing of the series of sequential prioritization operations further comprises:

determining that the fourth prioritization operation does not result in a prioritization that will facilitate resolving the conflict and recording the media program; and performing, in response to the determining that the fourth prioritization operation does not result in the prioritization that will facilitate resolving the conflict and recording the media program, the fifth prioritization operation to determine a fifth relative priority of media programs.

13. The method of claim 8, embodied as computer-executable instructions on at least one non-transitory computer-readable medium.

14. A system comprising:
at least one physical cloud computing device remote from and in communication with a local digital video recording ("DVR") system by way of a network and that:
  detects an input command provided by a user during a scheduling session and representative of a request for the local DVR system to record a media program during a presentation time period;
  identifies, in response to the detection of the input command, a conflict associated with the request for the local DVR system to record the media program, the conflict comprising a maximum storage space conflict in which a maximum amount of storage space of the local DVR system will be exceeded as a result of the recording of the media program;
  performs in response to the identification of the conflict, a first prioritization operation to determine a first relative priority of media programs that are at least one of scheduled to be recorded by the local DVR system at any given time during the presentation time period and currently recorded in a memory of the local DVR system, the first prioritization operation including determining whether a relatively lower definition version of the media program is available;
  determines, after the at least one physical cloud computing device performs the first prioritization operation, that the maximum amount of storage space of the local DVR system will still be exceeded as a result of the recording of the relatively lower definition version of the media program and that the first prioritization operation does not result in a prioritization of the media programs that will facilitate resolving the conflict and recording the media program;
  performs, in response to the determining that the first prioritization operation does not result in the prioritization of the media programs that will facilitate resolving the conflict and recording the media program, a second prioritization operation to determine a second relative priority of the media programs, the second prioritization operation including determining whether there are any media programs already stored in the memory of the local DVR system that the user has not watched;
  determines, after the performing of the second prioritization operation, that the maximum amount of storage space of the local DVR system will still be exceeded as a result of deleting one or more media programs that the user has not watched and that the second prioritization operation does not result in a prioritization of the media programs that will facilitate resolving the conflict and recording the media program;
  performs, in response to the determining that the second prioritization operation does not result in the prioritization of the media programs that will facilitate resolving the conflict and recording the media program, a third prioritization operation to determine a third relative priority of the media programs; and
  automatically performs, based on the performance of the third prioritization operation and without requiring an additional input from the user, a predetermined action to resolve the conflict and facilitate the local DVR system recording the media program.

15. The system of claim 14, wherein the at least one physical cloud computing device further:
  identifies a maximum number of media programs other than the media program and that are already scheduled to be concurrently recorded by the local DVR system at any given time during the presentation time period;
  determines whether the maximum number of media programs that are already scheduled to be concurrently recorded by the local DVR system at any given time during the presentation time period equals a maximum-number-of-streams limitation of at least one of the local DVR system and an end-user premises network router communicatively coupled to the local DVR system; and
  automatically performs the predetermined action by automatically canceling at least one of the media programs that are scheduled to be concurrently recorded based on the determined relative priority of the media programs.

16. The system of claim 14, wherein the at least one physical cloud computing device further:
  automatically performs the predetermined action by automatically deleting one or more of the media programs already stored in the memory of the local DVR system.

* * * * *